United States Patent
Schneeman (10) Patent No.: US 11,933,052 B2
(45) Date of Patent: Mar. 19, 2024

(54) HANDRAIL MOUNT FOR FILET TABLES AND OTHER ACCESSORIES

(71) Applicant: Brian Schneeman, Mount Airy, MD (US)

(72) Inventor: Brian Schneeman, Mount Airy, MD (US)

( * ) Notice: Subject to any disclaimer, the term of this patent is extended or adjusted under 35 U.S.C. 154(b) by 194 days.

(21) Appl. No.: 17/670,881

(22) Filed: Feb. 14, 2022

(65) Prior Publication Data
US 2022/0275649 A1 Sep. 1, 2022

Related U.S. Application Data

(60) Provisional application No. 63/154,422, filed on Feb. 26, 2021.

(51) Int. Cl.
*E04F 11/18* (2006.01)

(52) U.S. Cl.
CPC ....... *E04F 11/18* (2013.01); *E04F 2011/1868* (2013.01)

(58) Field of Classification Search
CPC ... E02B 3/068; E04F 11/18; E04F 2011/1868; B63B 27/143; A47B 97/00; A47B 91/08; E04H 4/144; E06C 7/006
See application file for complete search history.

(56) References Cited

U.S. PATENT DOCUMENTS

| | | | | |
|---|---|---|---|---|
| 4,074,683 A * | 2/1978 | Di Chiara | ............... | A61H 3/00 211/164 |
| 4,826,240 A * | 5/1989 | Karpiuk | ............... | A61H 3/00 297/335 |
| 5,170,810 A * | 12/1992 | Chapin | ............... | A61H 3/00 224/281 |
| 5,217,032 A * | 6/1993 | Jobst | ............... | A61H 3/00 297/5 |
| 5,694,959 A * | 12/1997 | Hiller | ............... | A61H 3/04 135/66 |
| 6,279,591 B1 * | 8/2001 | Obitts | ............... | A61H 3/00 135/73 |
| 6,883,529 B2 * | 4/2005 | Kvaternik | ............... | A61H 3/00 135/66 |
| 8,695,957 B2 | 4/2014 | Products | | |
| 10,000,902 B1 | 6/2018 | Huml | | |
| 10,113,361 B2 | 10/2018 | Cheng et al. | | |
| 10,123,598 B2 * | 11/2018 | Achillopoulos | ......... | A45C 5/14 |
| 10,588,305 B2 | 3/2020 | Larkin | | |
| 2008/0135078 A1 * | 6/2008 | Hsieh | ............... | A61H 3/00 135/67 |
| 2011/0253852 A1 | 10/2011 | Whelan | | |
| 2016/0353877 A1 * | 12/2016 | Brus | ............... | A47B 5/02 |
| 2019/0249824 A1 | 8/2019 | Floe | | |

\* cited by examiner

*Primary Examiner* — Daniel J Wiley (74) *Attorney, Agent, or Firm* — Royal W. Craig; Gordon Feinblatt LLC (57) ABSTRACT

A handrail mount for filet tables and other accessories that relies on two opposing sleeves that slide over the already-in-place ladder handrails. Each sleeve comprises a pair of long, narrow, open conduits that face each other, separated by spacers. The conduits define open troughs that slidably receive the tubular handrails. Each sleeve includes a clamp for clamping the ladder handrail in place. A filet table or other object may be secured atop the two opposing sleeves by locking handle latches, and a knife storage box can be hung on the sleeves.

14 Claims, 6 Drawing Sheets

HANDRAIL MOUNT FOR FILET TABLES AND OTHER ACCESSORIES

CROSS-REFERENCE TO RELATED APPLICATION(S)

The present invention derives priority from U.S. Provisional Patent Application Ser. No. 63/154,422 filed 26 Feb. 2021.

BACKGROUND OF THE INVENTION

1. Field of the Invention

The present invention relates generally to mounting mechanisms and, more particularly, to a mounting mechanism for securing filet tables and other accessories to any pair of spaced tubular ladder handrails such as found on docks, pools, etc.

2. Description of the Background

Owners of waterfront property often purchase watercraft, and owners of both often install docks to keep their watercraft on the water. However, docks and piers are expensive and obtrusive, and consequently they are typically constrained to a minimal size. Moreover, floating docks are susceptible to waves, current, and tidal action, and so it can be very challenging to walk down a long narrow dock on a windy day. For this reason dock owners typically do not equip their docks with many accoutrements that would otherwise take up valuable space, appear unsightly, and/or present an injury risk. They install a metal dock ladder to disembark their watercraft, possibly a dock box, and that is all. They typically do not install permanent filet tables, elevated tool or storage boxes, or anything above waist level that might cramp available space or present an injury risk. Nevertheless, there is a substantial need to mount a filet table on a dock where it is most convenient for disembarking fisherman, or other accessories such as camera and video equipment, tackle boxes, lights, bumpers, etc. A variety of mounting mechanisms have evolved to removably mount these things, but they typically rely on rod holders or the like. It would be advantageous to provide a secure but removable mounting mechanism that would allow attachment to the dock ladder. These ladders are invariably made of tubular aluminum or stainless steel with curved handrails arching up and onto the dock.

There are numerous existing patents for general-purpose clamps to attach to tubular rails. For example, United States Patent Application 20110253852 by Whelan et al. shows a bracket for mounting an electrical panel to a handrail.

U.S. Pat. No. 8,695,957 to Quintania et al. (Pryor Products) shows a general-purpose rail clamp with a C-shaped profile and tightening knob.

U.S. Pat. No. 10,000,902 to Huml shows a removable dock bracket support for a fixed dock-pylon.

United States Patent Application 20190249824 by Floe shows a quick attach bracket system in which a tightening knob urges a tongue-in-groove mounting bracket into locking engagement with a base.

There are also existing patents for mounting accessories to dock pylons. For example, U.S. Pat. No. 10,588,305 to Larkin et al. issued Mar. 17, 2020 shows a marine hub that attaches to a vertical support post.

However, there are relatively few efforts specifically geared to dock ladders. U.S. Pat. No. 10,113,361 to Cheng et al. shows a mechanical barrier that can be attached to a pool ladder to restrict access to a pool by unsupervised minors.

A demand therefore exists for a mounting system for removably mounting a filet table or other accessory to a dock or pool ladder, that is easily movable, can withstand or support heavy loads, does not require permanent alteration of the ladder by using adhesives, drilling holes or tapping screws and does not require separate hardware to be affixed.

SUMMARY OF THE INVENTION

It is a primary object of the invention to provide a mounting mechanism for removably mounting filet tables and other accessories to a dock or pool ladder, or to any ladder having arched handrails.

It is another object to provide a mounting mechanism that is easily movable.

It is another object to provide a mounting mechanism that is very robust and can withstand or support heavy loads.

It is still another object to provide a mounting mechanism that does not require permanent alteration of the ladder by drilling holes, tapping screws or adhesives, and which does not require separate hardware to be affixed.

In accordance with these objects, the present invention is a handrail mount for filet tables and other accessories that relies on two opposing sleeves that slide over the already-in-place ladder handrails. Each of the two sleeves comprise a pair of long, narrow, open conduits that face each other, e.g., half-tubes fixedly attached to and separated from each other by spacers. The conduits define open troughs that face each other, and that conform to and receive the tubular handrails. The sleeves are likewise connected by spacers and are secured to the handrails by a clamp assembly that may be tightened to eliminate play in the respective sleeves. The mounted sleeves carry opposing support struts that define a support platform, and in an embodiment a filet table is secured atop the platform by a locking handle latch that is keyed to the filet table. In addition, the two sleeves present four forward-facing pins upon which a storage box can be hung.

The handrail mount can be easily adapted to mount a variety of other accessories.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is a handrail mount configured for removably mounting a filet table or other accessory to the arched upper handrails of a dock, pool or other similar ladder.

Figure 1:
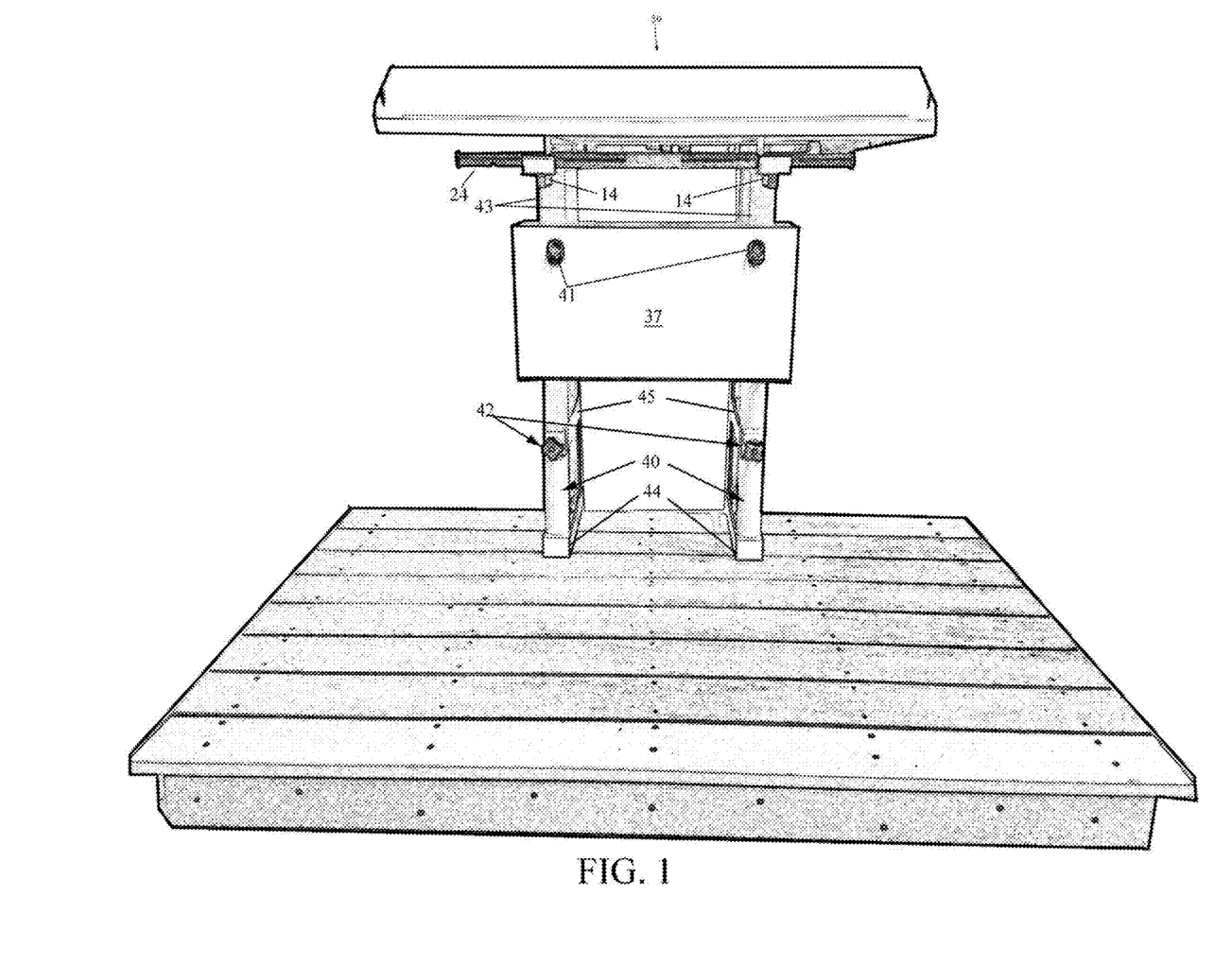
FIG. 1 is a perspective front view of an embodiment of a handrail mount with filet table according to an embodiment of the invention.
Figure 2:
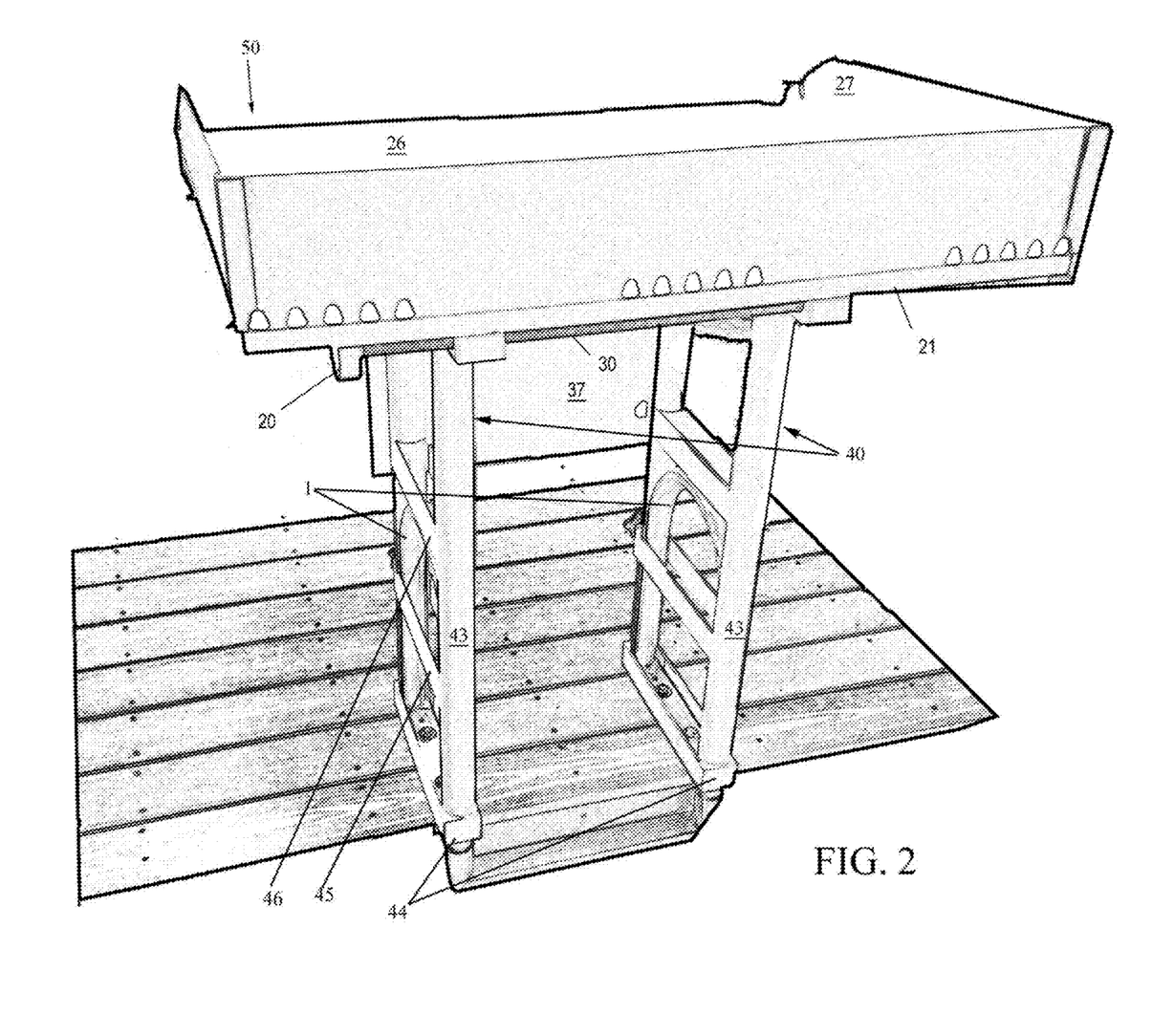
FIG. 2 is a perspective back view of the handrail mount with filet table of FIG. 1.
Figure 3:
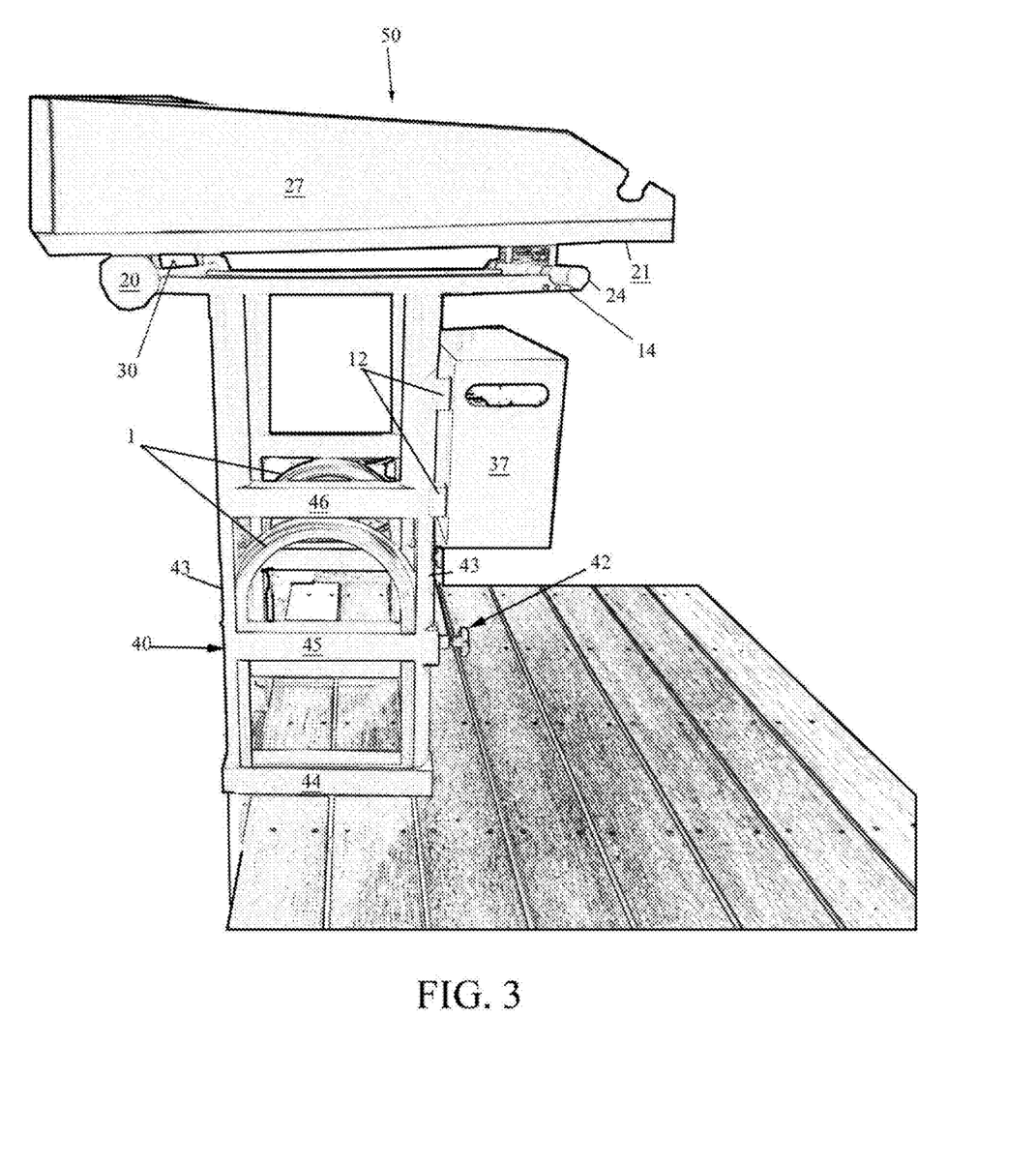
FIG. 3 is a perspective side view of the handrail mount with filet table of FIGS. 1-2.
Figure 4:
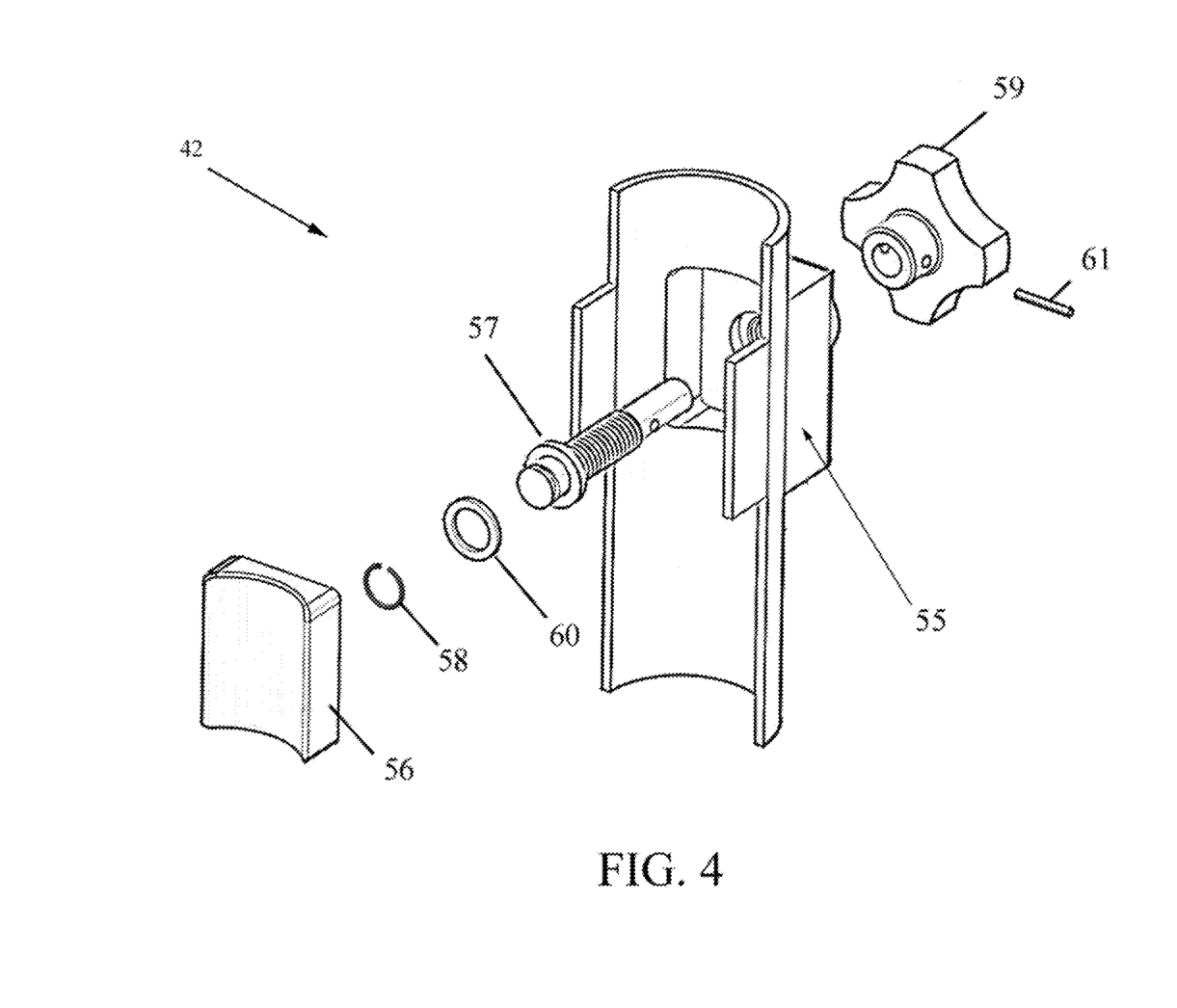
FIG. 4 is an exploded view of a clamp assembly 42 as in FIGS. 1-2.

FIGS. 1-3 show a handrail mount with filet table according to an embodiment of the invention. With combined reference to FIGS. 1-3, the handrail mount with filet table is configured for mounting to the arched upper handrails of any dock ladder 1, or pool ladder or the like, and relies on two opposing sleeve assemblies 40 that slide over the already-in-place ladder 1 handrails, and a clamp assembly 42 to lock in place and eliminate play. The two sleeve assemblies 40 are identical, and each comprises a pair of long, narrow, open main support conduits 43 held apart by spacer-struts 44, 45, 46 described below. The main support conduits 43 define open troughs that face each other, and receive and embrace the tubular handrails of ladder 1. The following is a listing of component parts for the embodiment shown in FIGS. 1-6:

accessory mounting blocks 12
mounting stud 13
locking handle latches 14
pivot pins 15
main support strut 17
skid pads 18
roller wheels 20
lattice reinforcing frame 21
end caps with axles 22
end caps 23
forward rail 24
work surface top 26
raised-edge pan 27
corner protectors 28
rear rail 30
storage box 37
sleeve assemblies 40
spring-detent closures 41
clamp assembly 42
main support conduits 43
bottom support platforms 44
middle support struts 45
upper support struts 46
straps 47 (or locking hinges)
slots 48
filet table 50
clamp housing 55
clamp pad 56
compression shaft 57
retaining C-ring 58
tightening knob 59
thrust washer 60
pin 61

More specifically, each of the main support conduits 43 may be formed of an elongate section of tubular stock cut in half lengthwise to define an open trough. The main support conduits 43 face each other, and thereby conform to and receive the tubular handrails of ladder 1. As mentioned above, the main support conduits 43 are connected by a plurality of spacer-struts (three sets shown per conduit 3) connecting them in a ladder-like fashion. The spacer struts include bottom support platforms 44 surrounding the main support conduits 43 at the bottom distal ends, and which provide a weight-bearing footing against the dock. In addition, two opposing middle support struts 45 and two opposing upper support struts 46 span the main support conduits 43. The spacer struts 44, 45, 46 are connected across both sides of main support conduits 43 as shown to define two opposing open sleeves for receiving the handrails of ladder 1. Each sleeve assembly 40 is equipped with at least one clamp assembly 42 along the length of a main support conduit 43 such as, for example, at the middle support struts 45 as shown.

As seen in FIG. 3 each clamp assembly 42 includes a clamp housing 55 that partially encircles and embraces the main support conduit lots, and a clamp pad 56 seated in the clamp housing 55. The clamp housing 55 preferably comprises a half-cylinder with inner walls conforming to the main support conduit 43, a reinforced base protruding outward therefrom, and a recess into the inner walls and the base to seat the clamp pad 56. The clamp pad 56 comprises a shoe with arcuate surface for bearing against the ladder 1. The clamp pad 56 is mounted distally on a compression shaft 57 that is threaded along its length and capped by a hub having an annular slot for a retaining C-ring 58. A thrust washer 60 is mounted on the hub of compression shaft 57, and the hub 60 is inserted into the clamp pad 56 and attached thereto by C-ring 58. The compression shaft 57 is threaded through the base of clamp housing 55 and a tightening knob 59 is mounted on the opposing end. The tightening knob 59 is secured to the compression shaft 57 by a pin 61 that passes through both, thereby ensuring that manual turning of the tightening knob 59 turns compression shaft 57, and advances or retracts clamp pad 56 into/out from the recess of clamp housing 55. This way, when the sleeve assemblies 40 are inserted onto the handrail of ladder 1 with main support conduits 43 in contact, the knob 59 of clamp assembly 42 is turned clockwise to advance clamp pad 56 and compress it against the handrail of ladder 1, thereby eliminating play and fortifying the engagement.

Figure 5:
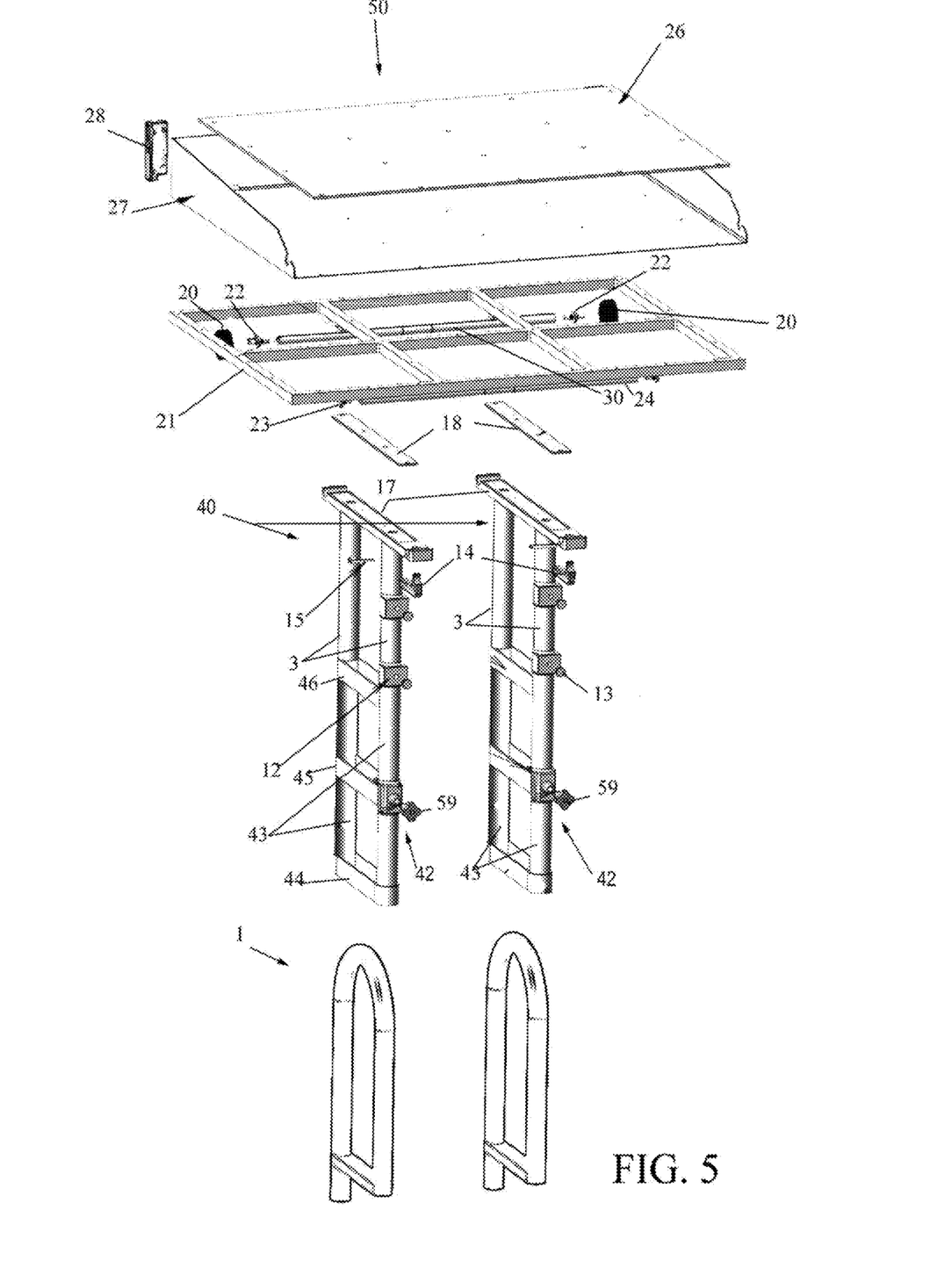
FIG. 5 is an exploded view of the handrail mount with filet table of FIGS. 1-4 with utility box 37 removed.

Referring back to FIG. 2, each main support conduit 43 is equipped with a pair of accessory mounting blocks 12. The accessory mounting blocks 12 are clamp-on or integrally-formed to conform to the curved main support conduits 43 and yet provide a flat outwardly-facing support surface. As seen in FIG. 5 each accessory mounting block 12 bears a forward protruding mounting stud 13 at the center of the flat support surface, and the accessory mounting blocks 12 are positioned along the upper support struts 46 to present a four-point mount for hanging storage box 37.

Figure 6:
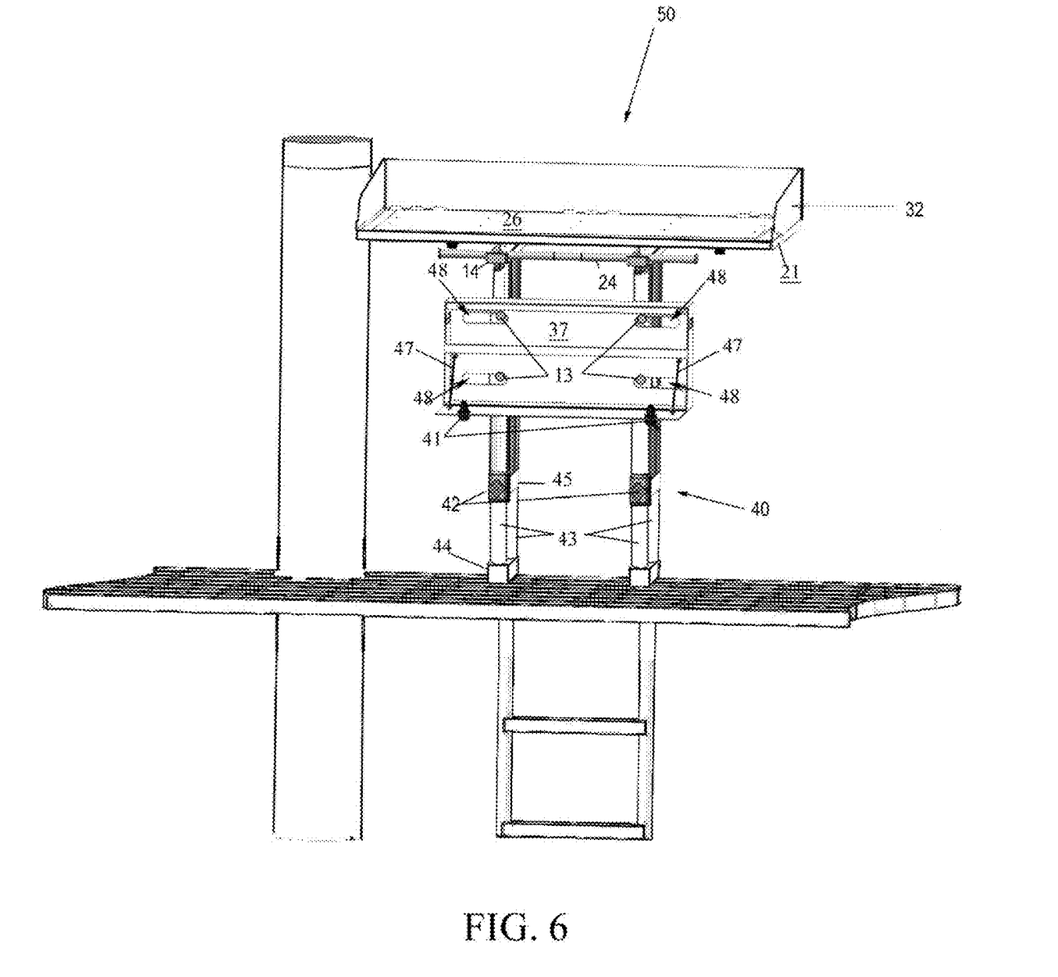
FIG. 6 is a front detail view of the handrail mount with filet table of FIGS. 1-5 with utility box 37 installed and open.

As best seen in FIG. 6, an exemplary storage box 37 comprises a five-sided enclosure fronted by a hanging-door. The enclosure rear wall has four slots 48 for releasably hanging storage box 37 on forward protruding mounting studs 13 across the two sleeve assemblies 40. The hanging door is tethered by straps 47, or alternately by locking hinges, to limit opening and is secured shut by spring-detent closures 41.

As seen in FIG. 5, a main support strut 17 straddles the main support conduits 43 of each sleeve assembly 40 and provides a flat support for a filet table 50 seated there atop. The main support struts 17 have lateral notches in their upward-facing surfaces proximate each end to seat and index the forward rail 24 and rear rail 30 as will be described below, and hence the lattice reinforcing frame 21. Nylon skid pads 18 line the main support struts 17 between the notches and are secured thereatop by skid pad mounting screws. In an embodiment, filet table 50 includes a rectangular work surface top 26 seated inside a raised-edge pan 27, and the edges of pan 27 may be equipped with plastic corner protectors 28. The work surface top 26 and pan 27 are seated atop the lattice reinforcing frame 21. Filet table 50 is designed for a removable snap-insertion onto forward rail 24 and rear rail 30 fit by a pair of rail-locks mounted there beneath. More specifically, forward rail 24 extends lengthwise along the forward undersection of frame 21, rail handle 24 being a tubular length with end caps 23 inserted therein. The rail lock handle 24 fits into cooperating locking handle latches 14 one each located proximate the top end of each sleeve assembly 40. The locking handle latches 14 are protruding brackets with conforming recesses for seating the rail lock handle 24, and with detent clips for releasably locking handle 24 in place. Similarly, rear rail 30 extends lengthwise along the rearward undersection of frame 21, rear rail 30 being a tubular length with end caps 22 inserted therein. Each end cap 22 extends a short axle on opposing sides of a retaining ring, and roller wheels 20 are mounted distally on the axle of each end cap 22. The roller wheels 20 are provided for protection when the filet table 50 it is removed and thrown into a car or boat. The rolling wheels 20 avoid scratching, and make it easier to roll the filet table 50 into a pickup truck bed after use. The rear rail 30 is captured beneath upwardly-inclined mounting pins 15 (see FIG. 5) one each located proximate the top end of each sleeve assembly 40.

In use, as best seen in FIG. 1, each sleeve assembly 40 (sans filet table 50) is inserted individually onto a respective handrail of ladder 1. To do this the tightening knob 59 should be retracted in the outer-most position by turning counter-clockwise, which allows clamp pad 56 to clear the ladder. Now, one tube sleeve assembly 40 is simply slid over the already in place ladder 1 that is mounted to the dock platform. When inserted to the desired height the clamp tightening knob 59 is tightened clockwise to tighten clamp assembly 42 and eliminate play between the main support tube 43. The procedure is repeated for the other sleeve assembly 40 on the opposing handrail of ladder 1, resulting in two parallel main support rails 17 at the top of each sleeve assembly 40 to seat filet table 50 there atop.

The filet table 50 is brought to bear against the main support rails 17 and is slid rearward along nylon skid pads 18 until the lattice reinforcing frame 21 falls into the lateral notches in the upward-facing main support rails 17. At the same time rear rail 30 is captured beneath the upwardly-inclined pivot pins 15. The filet table 50 is pivoted forward and pressed down at the forward end until the forward rail 24 snaps into the locking handle latches 14. To ensure that the filet table 50 is secured in place, give the front, the area closest to the installer a tug in the upward direction.

The storage box 37 may be hung by inserting it onto studs 13 via slots 48 and securing in place, where it hangs securely on studs 13.

One skilled in the art will readily understand that the horizontal and vertical positioning of filet table 50 may be adjusted within a wide range to accommodate obstructions, and for ease of use.

It should now be apparent that the above-described mounting mechanism does not require permanent alteration of the ladder or dock, yet it is very robust and can withstand or support heavy loads. Moreover, it can be easily unsecured and removed.

It should also be apparent that the mounting mechanism can be adapted to secure most any accessory to the ladder and dock. Accordingly, the specification and drawings are to be regarded in an illustrative rather than exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

What is claimed is:

1. A handrail mount for mounting an object to a dock ladder, said dock ladder comprising opposing parallel siderails connected together by steps, each said siderail contiguous with an arched upper handrail, said handrail mount comprising:
    a pair of parallel sleeves, each sleeve being configured to slide over a corresponding one of the arched upper handrails of said dock ladder and engage with opposing outer surfaces of said upper handrails, each of said parallel sleeves further comprising:
        a pair of elongate open-faced support conduits fixed in a facing relationship to each other by a plurality of cross-struts;
    at least one clamp on at least one of said elongate open-faced support conduits of each sleeve for clamping said sleeve to one of the upper handrails of said dock ladder; and
    a latching mounting platform atop and straddling said pair of parallel sleeves for releasably mounting an object atop the arched upper handrails of said dock ladder.

2. The handrail mount according to claim 1, wherein said plurality of cross-struts comprises a base that seats distal ends of said pair of elongate open-faced support conduits.

3. The handrail mount according to claim 2, wherein said plurality of cross-struts comprises an upper cross-strut and a middle cross strut between said base and said upper cross-strut.

4. The handrail mount according to claim 1, wherein said at least one clamp comprises a screw-clamp for clamping the handrail of said ladder into said pair of elongate support conduits.

5. A handrail mount for mounting an object to a dock ladder, said dock ladder comprising opposing parallel siderails connected together by steps, each said siderail contiguous with an arched upper handrail, said handrail mount comprising:
    a sleeve assembly comprising a pair of elongate open-faced support conduits fixed in a facing relationship to each other by a plurality of cross-struts defining an open-ended sleeve configured for slidable insertion onto the arched upper handrail of said dock ladder and engaging with opposing outer surfaces of said upper handrails; and
    at least one clamp on at least one of said elongate open-face support conduits for clamping said at least one sleeve assembly to one of said upper handrails of said dock ladder; and
    a latching mounting platform atop said sleeve assembly for releasably mounting an object atop the arched upper handrails of said dock ladder.

6. The handrail mount according to claim 5, wherein said plurality of cross-struts comprises a base that seats distal ends of said pair of elongate open-faced support conduits.

7. The handrail mount according to claim 6, wherein said plurality of cross-struts comprises an upper cross-strut and a middle cross strut between said base and said upper cross-strut.

8. The handrail mount according to claim 5, wherein said at least one clamp comprises a screw-clamp for clamping the handrail of said ladder into said pair of elongate support conduits.

9. A filet table configured for removable mounting atop a pair of arched upper handrails of a dock ladder, said dock ladder comprising opposing parallel siderails connected together by steps, each said siderail contiguous with an arched upper handrail, said handrail mount comprising:

a pair of sleeve assemblies each configured for slidable insertion onto a corresponding one of the arched upper handrail of said dock ladder and engage with opposing outer surfaces of said upper handrails, each of said parallel sleeves further comprising:

a pair of elongate open-faced support conduits fixed in a facing relationship to each other by a plurality of cross-struts;

at least one clamp on at least one of said elongate open-faced support conduits of each sleeve for clamping said sleeve to one of the upper handrails of said dock ladder;

a mounting platform atop each sleeve and straddling said pair of parallel sleeves; and a filet table mounted on said mounting platform.

10. The filet table assembly according to claim 9, wherein said plurality of cross-struts comprises a base that seats distal ends of said pair of elongate open-faced support conduits.

11. The filet table assembly according to claim 9, wherein said plurality of cross-struts comprises at least two cross-struts spanning each side of said pair of sleeve assemblies.

12. The filet table assembly according to claim 11, further comprising a base into which a distal end of said pair of sleeve assemblies is inserted.

13. The filet table assembly according to claim 9, wherein said at least one clamp comprises a screw-clamp for clamping the handrail of said ladder into said pair of elongate support conduits.

14. The filet table assembly according to claim 9, further comprising a pair of latches for removably locking said filet table atop said main support struts.

* * * * *